United States Patent
Fujita et al.

(10) Patent No.: US 10,381,128 B2
(45) Date of Patent: Aug. 13, 2019

(54) FLAME-RETARDANT FLEXIBLE POLYMER COMPOSITION, AND POLYMER TUBE AND INSULATED WIRE FORMED FROM THE POLYMER COMPOSITION

(71) Applicants: SUMITOMO ELECTRIC INDUSTRIES, LTD., Osaka-shi, Osaka (JP); SUMITOMO ELECTRIC FINE POLYMER, INC., Sennan-gun, Osaka (JP)

(72) Inventors: Taro Fujita, Osaka (JP); Shinya Nishikawa, Osaka (JP); Hayato Aoi, Osaka (JP); Ryohei Fujita, Osaka (JP)

(73) Assignees: SUMITOMO ELECTRIC INDUSTRIES, LTD., Osaka-shi, Osaka (JP); SUMITOMO ELECTRIC FINE POLYMER, INC., Sennan-gun, Osaka (JP)

( * ) Notice: Subject to any disclaimer, the term of this patent is extended or adjusted under 35 U.S.C. 154(b) by 220 days.

(21) Appl. No.: 14/729,484

(22) Filed: Jun. 3, 2015

(65) Prior Publication Data
US 2015/0357080 A1    Dec. 10, 2015

(30) Foreign Application Priority Data
Jun. 5, 2014   (JP) .................... 2014-116786

(51) Int. Cl.
| | |
|---|---|
| *C08L 23/28* | (2006.01) |
| *H01B 3/30* | (2006.01) |
| *C08K 3/22* | (2006.01) |
| *C08K 3/26* | (2006.01) |
| *C08L 23/06* | (2006.01) |
| *C08L 23/08* | (2006.01) |

(52) U.S. Cl.
CPC ............. *H01B 3/307* (2013.01); *C08K 3/22* (2013.01); *C08K 3/26* (2013.01); *C08L 23/06* (2013.01); *C08L 23/0815* (2013.01); *C08L 23/286* (2013.01); *C08L 2201/02* (2013.01); *C08L 2203/18* (2013.01); *Y10T 428/1372* (2015.01); *Y10T 428/294* (2015.01)

(58) Field of Classification Search
CPC ...................................... C08L 23/286
USPC ....... 428/36.9, 920, 921; 524/436; 174/68.1, 174/110 R, 110 SR
See application file for complete search history.

(56) References Cited

U.S. PATENT DOCUMENTS

| | | | |
|---|---|---|---|
| 2004/0147660 A1* | 7/2004 | Ishida ..................... | C01B 33/24 524/442 |
| 2009/0143535 A1* | 6/2009 | Vanek .................. | C08L 23/286 525/213 |
| 2013/0243988 A1* | 9/2013 | Fujita ..................... | C08K 3/34 428/36.9 |

FOREIGN PATENT DOCUMENTS

| | | |
|---|---|---|
| JP | H03-074449 A | 3/1991 |
| JP | 2003-040616 A | 2/2003 |
| JP | 2011-225673 A | 11/2011 |
| JP | 2012-122036 A | 6/2012 |
| JP | 2013-018935 A | 1/2013 |

OTHER PUBLICATIONS

ELASLEN grade list, printed Dec. 1, 2013.*

* cited by examiner

*Primary Examiner* — Matthew D Matzek
(74) *Attorney, Agent, or Firm* — Drinker Biddle & Reath LLP

(57) ABSTRACT

A flame-retardant flexible polymer composition includes a polymer component that contains 98 to 80 parts by mass of a chlorinated polyethylene and 2 to 20 parts by mass of a polyolefin polymer; and calcium hydroxide particles having a surface containing calcium silicate, wherein a content of the particles relative to 100 parts by mass of the polymer component is 5 parts by mass or more and 20 parts by mass or less. A polymer tube is formed from the flame-retardant flexible polymer composition. An insulated wire includes an insulation formed from the flame-retardant flexible polymer composition.

3 Claims, No Drawings

FLAME-RETARDANT FLEXIBLE POLYMER COMPOSITION, AND POLYMER TUBE AND INSULATED WIRE FORMED FROM THE POLYMER COMPOSITION

BACKGROUND OF THE INVENTION

1. Field of the Invention

The present invention relates to a flame-retardant flexible polymer composition used as a material for forming polymer tubes, in particular, to a flame-retardant flexible polymer composition used as a material for forming heat-shrinkable tubes used for rendering, waterproof and insulated, electric wires and wiring harnesses and portions thereof where wires are bound together. The present invention also relates to a polymer tube formed from the flame-retardant flexible polymer composition and an insulated wire including an insulation formed from the flame-retardant flexible polymer composition.

2. Description of the Related Art

In order to render, waterproof and insulated, electric wires and wiring harnesses used for automobiles, aircraft, and the like and portions of the electric wires and wiring harnesses where wires are bound together, heat-shrinkable tubes are used that are tubes formed from chlorinated polyethylene, polyvinyl chloride, or the like and having heat-shrinkability. There is sometimes a demand for heat-shrinkable tubes having high performance in terms of oil resistance, heat resistance, flame retardancy, and mechanical strength, for example. In order to meet this demand, various polymer tubes have been proposed. Various polymer compositions serving as materials for forming these tubes have also been proposed.

For example, Japanese Unexamined Patent Application Publication No. 2011-225673 discloses a polymer tube formed from a wear-resistant polymer composition containing, as main components, 50 to 100 parts by mass of a chlorinated polyethylene, 50 to 0 parts by mass of a high-density polyethylene, and, relative to 100 parts by mass of the total mass of the chlorinated polyethylene and the high-density polyethylene, 1 to 10 parts by mass of hydrotalcite; the polymer tube being formed by irradiating the polymer composition with radiation to cause cross-linking. This publication states that this wear-resistant polymer composition is applied so as to cover a conductor to thereby provide an insulated wire including an insulation that is excellent in terms of wear resistance as well as flexibility, heat resistance, oil resistance, flame retardancy, and processability.

Japanese Unexamined Patent Application Publication No. 2013-018935 discloses a flame-retardant flexible polymer composition including a polymer component containing a chlorinated polyethylene as a main component and, relative to 100 parts by mass of the chlorinated polyethylene, 0.5 to 20 parts by mass of a zeolite compound; and a polymer tube and an insulated wire including an insulation, the polymer tube and the insulation being formed from the flame-retardant flexible polymer composition through cross-linking caused by irradiation with ionizing radiation. This publication states that this polymer tube is excellent and highly balanced in terms of mechanical strength, flexibility, heat resistance, oil resistance, flame retardancy, and processability.

SUMMARY OF THE INVENTION

The polymer compositions in Japanese Unexamined Patent Application Publication Nos. 2011-225673 and 2013-018935 contain hydrotalcite and the zeolite compound as stabilizers for the polymers. These substances are lead-free stabilizers, which do not contain lead, and trap hydrochloric acid generated at high temperature during shaping to thereby stabilize the polymers.

However, addition of hydrotalcite or a zeolite compound to a polymer composition tends to result in generation of pores or rough surfaces during shaping by extrusion at a high line speed. This is probably caused by the following mechanism. In order to perform extrusion at a high line speed, the number of revolutions of an extrusion screw is increased. Shearing with the screw generates heat, which increases the temperature. At the resultant high temperature, water of crystallization or adsorbed water is dissociated from the hydrotalcite or the zeolite compound.

An object of the present invention is to provide a flame-retardant flexible polymer composition that can be used as a material for forming a shaped article having high oil resistance, heat resistance, flame retardancy, and mechanical strength, such as a polymer tube, and that does not cause generation of pores and tends not to cause problems including generation of rough surfaces during shaping by extrusion even at high line speeds.

Other objects of the present invention are to provide a polymer tube formed from the flame-retardant flexible polymer composition and an insulated wire including an insulation formed from the flame-retardant flexible polymer composition.

A flame-retardant flexible polymer composition according to a first aspect of the present invention includes a polymer component that contains 98 to 80 parts by mass of a chlorinated polyethylene and 2 to 20 parts by mass of a polyolefin polymer; and calcium hydroxide particles having a surface containing calcium silicate, wherein a content of the particles relative to 100 parts by mass of the polymer component is 5 parts by mass or more and 20 parts by mass or less.

A polymer tube according to a second aspect of the present invention is produced by shaping a flame-retardant flexible polymer composition into a tube, the polymer composition including a polymer component that contains 98 to 80 parts by mass of a chlorinated polyethylene and 2 to 20 parts by mass of a polyolefin polymer and calcium hydroxide particles having a surface containing calcium silicate in which a content of the particles relative to 100 parts by mass of the polymer component is 5 parts by mass or more and 20 parts by mass or less; and by irradiating the polymer composition with ionizing radiation to cross-link the polymer component.

An insulated wire according to a third aspect of the present invention includes a conductor and an insulation covering the conductor, wherein the insulation is formed from a flame-retardant flexible polymer composition including a polymer component including 98 to 80 parts by mass of a chlorinated polyethylene and 2 to 20 parts by mass of a polyolefin polymer and calcium hydroxide particles having a surface containing calcium silicate in which a content of the particles relative to 100 parts by mass of the polymer component is 5 parts by mass or more and 20 parts by mass or less; and the polymer component in the insulation is cross-linked by irradiation with ionizing radiation.

Use of the flame-retardant flexible polymer composition according to the first aspect of the present invention allows formation of shaped articles having high oil resistance, heat resistance, flame retardancy, and mechanical strength, such as polymer tubes; and the polymer composition does not cause generation of pores and tends not to cause problems including generation of rough surfaces during shaping by extrusion even at high line speeds.

The polymer tube according to the second aspect of the present invention has high oil resistance, heat resistance, flame retardancy, and mechanical strength and has a good appearance without pores, rough surfaces, or the like. The insulated wire according to the third aspect of the present invention includes an insulation that has high oil resistance, heat resistance, flame retardancy, and mechanical strength and has a good appearance without pores, rough surfaces, or the like.

DESCRIPTION OF THE PREFERRED EMBODIMENTS

Hereinafter, embodiments for carrying out the present invention will be described. However, the scope of the present invention is not limited to these embodiments or Examples. Various modifications can be made without departing from the spirit and scope of the present invention.

A flame-retardant flexible polymer composition according to a first aspect of the present invention includes a polymer component that contains 98 to 80 parts by mass of a chlorinated polyethylene and 2 to 20 parts by mass of a polyolefin polymer; and calcium hydroxide particles having a surface containing calcium silicate, wherein a content of the particles relative to 100 parts by mass of the polymer component is 5 parts by mass or more and 20 parts by mass or less.

The inventor of the present invention performed thorough studies. As a result, the inventor has found that a mixture containing a chlorinated polyethylene and a polyolefin polymer in a ratio within a predetermined range is mixed with calcium hydroxide particles having a surface containing calcium silicate (hereafter, referred to as "calcium silicate-coated calcium hydroxide") so as to satisfy a composition ratio within a predetermined range, to thereby provide a flame-retardant flexible polymer composition that achieves the above-described object. Thus, the inventor has accomplished the first aspect of the invention.

The flame-retardant flexible polymer composition according to the first aspect of the invention mainly contains a polymer mixture (polymer component) containing a chlorinated polyethylene and a polyolefin polymer. If the polymer mixture containing a chlorinated polyethylene and a polyolefin polymer is replaced by polyvinyl chloride, sufficiently high oil resistance cannot be provided for heat-shrinkable tubes used for rendering, waterproof and insulated, electric wires and wiring harnesses for automobiles, aircraft, and the like and portions of the electric wires and wiring harnesses where wires are bound together.

The types of the chlorinated polyethylene and the polyolefin polymer forming the flame-retardant flexible polymer composition of the first aspect are not particularly limited. Note that the chlorinated polyethylene preferably has a chlorine content in an appropriate range. The reason for this is as follows: as the chlorine content of the chlorinated polyethylene increases, the flame retardancy and oil resistance are enhanced, but the heat aging property is degraded. Specifically, the chlorine content is preferably 10% to 50% by weight, in particular, preferably 20% to 40% by weight. For the flame-retardant flexible polymer composition, a single chlorinated polyethylene may be used alone or a plurality of chlorinated polyethylenes may be used in combination so as to satisfy such a chlorine-content range as a whole.

Examples of the polyolefin polymer include polyethylene polymers such as high-density polyethylenes, medium-density polyethylenes, and low-density polyethylenes; and polypropylene polymers. In particular, high-density polyethylene polymers having a density of 0.95 g/cm$^3$ or more are preferred because higher oil resistance tends to be achieved. Thus, a preferred embodiment of the first aspect provides a flame-retardant flexible polymer composition in which the polyolefin polymer is a high-density polyethylene polymer having a density of 0.95 g/cm$^3$ or more.

The polymer component contains a chlorinated polyethylene and a polyolefin polymer such that the mass ratio of chlorinated polyethylene/polyolefin polymer is in the range of 98/2 to 80/20. In a case where the mass ratio of the chlorinated polyethylene to the total mass of the chlorinated polyethylene and the polyolefin polymer is more than 98% (the mass ratio of the polyolefin polymer is less than 2%), an increase in the extrusion rate (line speed) during extrusion into polymer tubes or insulations tends to cause problems including generation of rough surfaces. In another case where the mass ratio of the chlorinated polyethylene to the total mass of the chlorinated polyethylene and the polyolefin polymer is less than 80% (the mass ratio of the polyolefin polymer is more than 20%), the flame retardancy is poor and sufficiently high flame retardancy cannot be provided for heat-shrinkable tubes used for electric wires and wiring harnesses for automobiles, aircraft, and the like.

In a case where the mass ratio of the chlorinated polyethylene to the total mass of the chlorinated polyethylene and the polyolefin polymer is 90% or more, the resultant articles such as heat-shrinkable tubes advantageously have higher flexibility. Thus, a preferred embodiment of the first aspect provides a flame-retardant flexible polymer composition in which the polymer component contains 98 to 90 parts by mass of the chlorinated polyethylene and 2 to 10 parts by mass of the polyolefin polymer.

The flame-retardant flexible polymer composition according to the first aspect of the invention further includes calcium silicate-coated calcium hydroxide. The content of calcium silicate-coated calcium hydroxide relative to 100 parts by mass of the polymer mixture (polymer component) containing a chlorinated polyethylene and a polyolefin polymer is 5 to 20 parts by mass. The polymer composition needs to include calcium silicate-coated calcium hydroxide to achieve high heat resistance and oil resistance, not to cause generation of pores during shaping by extrusion even at high line speeds, and to provide shaped articles having a good appearance.

In a case where the content of calcium silicate-coated calcium hydroxide relative to 100 parts by mass of the polymer component containing a chlorinated polyethylene and a polyolefin polymer is less than 5 parts by mass, even without addition of hydrotalcite or zeolite compounds, generation of pores tends to occur during shaping or processing, in particular, at high extrusion rates. As a result, the resultant polymer tubes and insulations tend not to have good appearances and also tend to have low heat resistance and oil resistance. In another case where the content of calcium silicate-coated calcium hydroxide is more than 20 parts by mass, the flame-retardant flexible polymer composition tends to provide shaped articles having low tensile strength and tensile elongation and hence shaped articles having insufficient mechanical strength may be provided.

In a case where the content of calcium silicate-coated calcium hydroxide relative to 100 parts by mass of the polymer component containing a chlorinated polyethylene and a polyolefin polymer is 10 parts by mass or less, the resultant shaped articles such as heat-shrinkable tubes advantageously have higher flexibility. Thus, a preferred embodiment of the first aspect provides a flame-retardant flexible polymer composition in which the content of calcium hydroxide particles having a surface containing calcium silicate relative to 100 parts by mass of the polymer component is 5 parts by mass or more and 10 parts by mass or less.

The calcium silicate-coated calcium hydroxide denotes calcium hydroxide particles having a surface containing calcium silicate. This calcium silicate-coated calcium hydroxide can be produced by heating calcium hydroxide particles and amorphous silicic acid under non-milling conditions in an aqueous medium to cause a reaction between calcium hydroxide and amorphous silicic acid to generate calcium silicate on the surfaces of calcium hydroxide particles, and by drying the generated product. During this production, a small amount of silicic acid dissolves in the alkaline aqueous medium and the silicic acid reacts with calcium hydroxide in the surface regions of the particles to generate calcium silicate.

The calcium silicate-coated calcium hydroxide preferably has a Si/Ca molar ratio of 0.01 to 0.90 in terms of the whole particles. In a case where this molar ratio is less than 0.01, the surfaces of calcium hydroxide particles may be insufficiently covered with calcium silicate; as a result, calcium hydroxide, which is a base, promotes generation of hydrochloric acid from the chlorinated polyethylene, which causes generation of pores during extrusion and degradation of heat aging property. In a case where this molar ratio is more than 0.90, the proportion of calcium hydroxide is low and the capability of trapping hydrochloric acid generated from the chlorinated polyethylene is degraded, which may result in degradation of heat aging property. The Si/Ca molar ratio is more preferably 0.03 to 0.70, in particular, preferably 0.05 to 0.40.

A flame-retardant flexible polymer composition according to the first aspect of the invention may optionally include, in addition to the above-described essential components, an antioxidant, a lubricant, and another stabilizer such as a zeolite compound or hydrotalcite without departing from the spirit and scope of the present invention. The flame-retardant flexible polymer composition may also include a polymer other than chlorinated polyethylenes and polyolefin polymers without departing from the spirit and scope of the present invention.

A polymer tube according to a second aspect of the present invention is produced by shaping a flame-retardant flexible polymer composition into a tube, the polymer composition including a polymer component that contains 98 to 80 parts by mass of a chlorinated polyethylene and 2 to 20 parts by mass of a polyolefin polymer and calcium hydroxide particles having a surface containing calcium silicate in which a content of the particles relative to 100 parts by mass of the polymer component is 5 parts by mass or more and 20 parts by mass or less; and by irradiating the polymer composition with ionizing radiation to cross-link the polymer component.

The polymer tube of the second aspect is produced by a method including a step of shaping the flame-retardant flexible polymer composition of the first aspect into a tube, and a step of irradiating the resultant shaped article (tube) with ionizing radiation to cross-link the polymer component. The polymer composition can be shaped by the same process as that is ordinarily used for forming the shapes of heat-shrinkable tubes, extrusion: the polymer composition is melted and extruded so as to have an annular cross section.

By using the flame-retardant flexible polymer composition of the first aspect, problems including generation of pores and rough surfaces tend not to occur even when the extrusion is carried out at a high extrusion rate.

The irradiation with ionizing radiation can also be carried out by the same process as that is ordinarily used for forming the shapes of heat-shrinkable tubes. Examples of the ionizing radiation include electromagnetic waves such as $\gamma$-rays, X-rays, and ultraviolet rays, and particle rays such as $\alpha$-rays and electron beams. In particular, electron beams are preferred from the standpoint of high controllability, simple use of the radiation source, penetration thickness of the ionizing radiation, and the rate of cross-linking, for example. The irradiation amount of ionizing radiation is selected such that cross-linking between a chlorinated polyethylene and a polyolefin polymer in the polymer composition occurs to provide a desired mechanical strength while irradiation with ionizing radiation does not cause decomposition of the polymer.

In a case where the polymer tube of the second aspect is a heat-shrinkable tube, the tube having been irradiated with ionizing radiation is subjected to a process of increasing the diameter of the tube in the radial direction so that the tube is turned into a heat-shrinkable tube. The diameter of the polymer tube can be increased by processes that are ordinarily used for producing heat-shrinkable tubes, such as injection of high-pressure air into the polymer tube.

An insulated wire according to a third aspect of the present invention includes a conductor and an insulation covering the conductor, wherein the insulation is formed from a flame-retardant flexible polymer composition including a polymer component including 98 to 80 parts by mass of a chlorinated polyethylene and 2 to 20 parts by mass of a polyolefin polymer and calcium hydroxide particles having a surface containing calcium silicate in which a content of the particles relative to 100 parts by mass of the polymer component is 5 parts by mass or more and 20 parts by mass or less; and the polymer component in the insulation is cross-linked by irradiation with ionizing radiation.

The insulated wire of the third aspect can be produced by covering a conductor such as a copper wire with a heat-shrinkable polymer tube of the second aspect and by heating the tube to shrink. Alternatively, the insulated wire can be produced by the following method: a flame-retardant flexible polymer composition of the first aspect is extruded into a tube so as to cover the surface of a conductor; and the polymer composition is then irradiated with ionizing radiation to cross-link the polymer. Since the flame-retardant flexible polymer composition of the first aspect is used, problems including generation of pores and rough surfaces tend not to occur even when the polymer composition is extruded at an increased extrusion rate.

Examples

1. Production of Flame-Retardant Flexible Polymer Composition

The following raw materials were mixed in accordance with the formulations (unit: parts by mass) described in Tables I to III to provide polymer compositions of Experimental examples 1 to 13.

Raw Materials

Chlorinated polyethylene: ELASLEN 252B (manufactured by SHOWA DENKO K. K.)

Polyethylene A: HI-ZEX 5305E (manufactured by Prime Polymer Co., Ltd., density: 0.951 g/cm$^3$)

Polyethylene B: DGDN3364 (manufactured by NUC Corporation, density: 0.945 g/cm³)

Polyvinyl chloride: PVC (degree of polymerization: 1300) (manufactured by Shin-Etsu Chemical Co., Ltd.)

Plasticizer: TOTM (manufactured by DIC Corporation)

Calcium silicate-coated calcium hydroxide: MIZUKALIZER RAD-JTC (manufactured by Mizusawa Industrial Chemicals, Ltd.)

Fired zeolite: MIZUKALIZER 5AP (manufactured by Mizusawa Industrial Chemicals, Ltd.)

Synthesized hydrotalcite: DHT-4A (manufactured by Kyowa Chemical Industry Co., Ltd.)

Flame retardant: antimony(III) oxide

Calcium carbonate: KS1000 (manufactured by CALFINE Co., Ltd.)

Antioxidant: IRGANOX 1010 (manufactured by Ciba Specialty Chemicals)

Lubricant: stearic acid (manufactured by NOF CORPORATION)

TABLE I

| | | Experimental example 1 | Experimental example 2 | Experimental example 3 | Experimental example 4 | Experimental example 5 |
|---|---|---|---|---|---|---|
| Polymer | Chlorinated polyethylene | 97 | 97 | 97 | 80 | 97 |
| | Polyethylene A | 3 | 3 | 3 | 20 | — |
| | Polyethylene B | — | — | — | — | 3 |
| | Polyvinyl chloride | — | — | — | — | — |
| Plasticizer (TOTM) | | — | — | — | — | — |
| Calcium silicate-coated calcium hydroxide | | 5 | 10 | 20 | 10 | 10 |
| Calcium hydroxide | | — | — | — | — | — |
| Fired zeolite | | — | — | — | — | — |
| Synthesized hydrotalcite | | — | — | — | — | — |
| Flame retardant (antimony(III) oxide) | | 10 | 10 | 10 | 10 | 10 |
| Calcium carbonate | | 10 | 10 | 10 | 10 | 10 |
| Antioxidant (IRGANOX 1010) | | 1 | 1 | 1 | 1 | 1 |
| Lubricant (stearic acid) | | 1 | 1 | 1 | 1 | 1 |

TABLE II

| | | Experimental example 6 | Experimental example 7 | Experimental example 8 | Experimental example 9 |
|---|---|---|---|---|---|
| Polymer | Chlorinated polyethylene | 97 | 97 | 97 | 97 |
| | Polyethylene A | 3 | 3 | 3 | 3 |
| | Polyethylene B | — | — | — | — |
| | Polyvinyl chloride | — | — | — | — |
| Plasticizer (TOTM) | | — | — | — | — |
| Calcium silicate-coated calcium hydroxide | | 3 | 22 | — | — |
| Calcium hydroxide | | — | — | 10 | — |
| Fired zeolite | | — | — | — | 10 |
| Synthesized hydrotalcite | | — | — | — | — |
| Flame retardant (antimony(III) oxide) | | 10 | 10 | 10 | 10 |
| Calcium carbonate | | 10 | 10 | 10 | 10 |
| Antioxidant (IRGANOX 1010) | | 1 | 1 | 1 | 1 |
| Lubricant (stearic acid) | | 1 | 1 | 1 | 1 |

TABLE III

| | | Experimental example 10 | Experimental example 11 | Experimental example 12 | Experimental example 13 |
|---|---|---|---|---|---|
| Polymer | Chlorinated polyethylene | 97 | — | 99 | 75 |
| | Polyethylene A | 3 | — | 1 | 25 |
| | Polyethylene B | — | — | — | — |
| | Polyvinyl chloride | — | 100 | — | — |
| Plasticizer (TOTM) | | — | 50 | — | — |
| Calcium silicate-coated calcium hydroxide | | — | — | 10 | 10 |
| Calcium hydroxide | | — | — | — | — |
| Fired zeolite | | — | — | — | — |
| Synthesized hydrotalcite | | 10 | 10 | — | — |
| Flame retardant (antimony(III) oxide) | | 10 | 10 | 10 | 10 |
| Calcium carbonate | | 10 | 10 | 10 | 10 |
| Antioxidant (IRGANOX 1010) | | 1 | 1 | 1 | 1 |
| Lubricant (stearic acid) | | 1 | 1 | 1 | 1 |

2. Production of Polymer Tubes: Evaluation of Extrusion Processability

Polymer compositions obtained by mixing the raw materials in accordance with the formulations (unit: parts by mass) in Tables I to III were extruded into tubes with an extruder (screw diameter: ϕ60 mm, L/D=24) under different conditions (number of revolutions of screw/extrusion line speed) described in Tables IV to VI at a temperature of 180° C. set at the crosshead, to thereby provide polymer tubes. The inner diameters and outer diameters of the polymer tubes and the temperatures of the polymers being extruded are described in Tables IV to VI. The polymer tubes were visually inspected for pores and appearances. The evaluation results based on the following grading systems are described in Tables IV to VI.

Presence or Absence of Pores
  Good: No pores are observed in tube cross sections
  Poor: Pores are observed in tube cross sections
Appearance
  Good: The appearance is smooth
  Poor: The appearance is not smooth and has melt fracture or irregularities
3. Evaluation of Polymer Tubes
  Among the above-described polymer tubes evaluated in terms of extrusion processability, the polymer tubes obtained at a number of revolutions of screw of 40 rpm and at an extrusion line speed of 60 m/min were cooled and subsequently irradiated with electron beams at 200 kGy to cross-link the polymers. The polymers having been irradiated with electron beams were evaluated for mechanical strength (tensile strength and tensile elongation), flexibility (100% modulus), heat resistance, oil resistance, flame retardancy (UL94 burning test), and processability by methods described below. The evaluation results are described in Tables IV to VI.
Evaluation Methods
Tensile Strength and Tensile Elongation
  Samples were measured in accordance with JIS K 7161-1994 (ISO 5271:1993). Heat-shrinkable tubes used for rendering electric wires and wiring harnesses for automobiles waterproof and insulated should meet the following standards: tensile strength >10.4 MPa and tensile elongation >225%.
Flexibility
  The value of 100% modulus of each sample was determined as the stress applied to achieve 100% elongation during the above-described measurement of tensile strength. The sample was evaluated for flexibility on the basis of this value.

Heat Resistance
  After stored at 121° C. for 7 days, the samples were measured for tensile strength and tensile elongation. The samples were evaluated for heat resistance on the basis of a decrease in tensile strength and a decrease in tensile elongation during storage. Heat-shrinkable tubes used for rendering electric wires and wiring harnesses for automobiles waterproof and insulated, after stored at 121° C. for 7 days, should meet the following standards: tensile strength >8.3 MPa and tensile elongation >175%.
Oil Resistance
  After immersed in an aircraft hydraulic fluid conforming to Military Specification MIL-H-5606 at room temperature for a day, the samples were measured for tensile strength and tensile elongation. The samples were evaluated for oil resistance on the basis of a decrease in tensile strength and a decrease in tensile elongation during immersion. Heat-shrinkable tubes used for rendering electric wires and wiring harnesses for automobiles waterproof and insulated, after immersed at room temperature for a day, should meet the following standards: tensile strength >6.9 MPa and tensile elongation >175%.
Flame Retardancy
  The samples were evaluated by UL94 vertical burning tests. Samples evaluated as UL94 V-0 or better are good samples.
Processability
  After pressed at 600 MPa, at 200° C., and for 10 minutes, the samples were visually inspected for pores. The evaluation results based on the following grading systems are described in Tables IV to VI.
Good: No pores are observed
Poor: Pores are visually observed

TABLE IV

| | Test items | | Experimental example 1 | Experimental example 2 | Experimental example 3 | Experimental example 4 | Experimental example 5 |
|---|---|---|---|---|---|---|---|
| Evaluation results of extrusion processability (extruder: screw diameter of φ60 mm, L/D = 24) | | | | | | | |
| | Tube | Inner diameter (φ mm) | 8 | 8 | 8 | 8 | 8 |
| | | Outer diameter (φ mm) | 10 | 10 | 10 | 10 | 10 |
| Presence or absence of pores/ appearance | Number of revolutions of screw/ extrusion line speed | 10 rpm/15 m/min | Good/Good | Good/Good | Good/Good | Good/Good | Good/Good |
| | | 20 rpm/30 m/min | Good/Good | Good/Good | Good/Good | Good/Good | Good/Good |
| | | 30 rpm/45 m/min | Good/Good | Good/Good | Good/Good | Good/Good | Good/Good |
| | | 40 rpm/60 m/min | Good/Good | Good/Good | Good/Good | Good/Good | Good/Good |
| | Set temperature (crosshead) | | 180 | 180 | 180 | 180 | 180 |
| Resin temperature ° C. | Number of revolutions of screw/ extrusion line speed | 10 rpm/15 m/min | 182 | 183 | 184 | 182 | 182 |
| | | 20 rpm/30 m/min | 189 | 191 | 193 | 188 | 188 |
| | | 30 rpm/45 m/min | 195 | 196 | 198 | 190 | 190 |
| | | 40 rpm/60 m/min | 201 | 202 | 210 | 195 | 195 |
| Evaluation results of tubes (evaluation of samples obtained with number of revolutions of screw/extrusion line speed = 40 rpm/60 m/min) | | | | | | | |
| | Tensile strength (MPa) | | 15.2 | 12.1 | 10.6 | 15.1 | 10.5 |
| | Tensile elongation (%) | | 295 | 270 | 235 | 260 | 350 |
| | 100% modulus | | 8.5 | 9.7 | 10.5 | 18.5 | 9.1 |
| Heat resistance | Tensile strength (MPa) | | 14.2 | 11.5 | 11.3 | 14.5 | 10.8 |
| | Tensile elongation (%) | | 210 | 265 | 240 | 265 | 320 |
| Oil resistance | Tensile strength (MPa) | | 11.8 | 11.0 | 10.2 | 12.1 | 7.1 |
| | Tensile elongation (%) | | 190 | 195 | 187 | 200 | 210 |
| | UL94 burning test | | V-0 | V-0 | V-0 | V-0 | V-0 |
| | Processability | | Good | Good | Good | Good | Good |

TABLE V

| Test items | | | Experimental example 6 | Experimental example 7 | Experimental example 8 | Experimental example 9 |
|---|---|---|---|---|---|---|
| Evaluation results of extrusion processability (extruder: screw diameter of φ60 mm, L/D = 24) | | | | | | |
| Tube | | Inner diameter (φ mm) | 8 | 8 | 8 | 8 |
| | | Outer diameter (φ mm) | 10 | 10 | 10 | 10 |
| Presence or absence of pores/appearance | Number of revolutions of screw/extrusion line speed | 10 rpm/15 m/min | Good/Good | Good/Good | Good/Good | Good/Good |
| | | 20 rpm/30 m/min | Good/Good | Good/Good | Poor/Good | Poor/Good |
| | | 30 rpm/45 m/min | Good/Good | Good/Good | Poor/Good | Poor/Good |
| | | 40 rpm/60 m/min | Poor/Good | Good/Good | Poor/Good | Poor/Good |
| | Set temperature (crosshead) | | 180 | 180 | 180 | 180 |
| Resin temperature ° C. | Number of revolutions of screw/extrusion line speed | 10 rpm/15 m/min | 181 | 185 | 183 | 183 |
| | | 20 rpm/30 m/min | 188 | 193 | 190 | 190 |
| | | 30 rpm/45 m/min | 194 | 200 | 195 | 195 |
| | | 40 rpm/60 m/min | 201 | 209 | 200 | 202 |
| Evaluation results of tubes (evaluation of samples obtained with number of revolutions of screw/extrusion line speed = 40 rpm/60 m/min) | | | | | | |
| | Tensile strength (MPa) | | 15.9 | 10.1 | 11.5 | 11.8 |
| | Tensile elongation (%) | | 310 | 230 | 285 | 250 |
| | 100% modulus | | 8.4 | 11 | 9.7 | 9.2 |
| Heat resistance | Tensile strength (MPa) | | 13.5 | 10.9 | 9.8 | 11.3 |
| | Tensile elongation (%) | | 170 | 240 | 230 | 250 |
| Oil resistance | Tensile strength (MPa) | | 9.1 | 10.1 | 6.5 | 5.1 |
| | Tensile elongation (%) | | 205 | 195 | 150 | 201 |
| | UL94 burning test | | V-0 | V-0 | V-0 | V-0 |
| | Processability | | Poor | Good | Poor | Poor |

TABLE VI

| Test items | | | Experimental example 10 | Experimental example 11 | Experimental example 12 | Experimental example 13 |
|---|---|---|---|---|---|---|
| Evaluation results of extrusion processability (extruder: screw diameter of φ60 mm, L/D = 24) | | | | | | |
| Tube | | Inner diameter (φ mm) | 8 | 8 | 8 | 8 |
| | | Outer diameter (φ mm) | 10 | 10 | 10 | 10 |
| Presence or absence of pores/appearance | Number of revolutions of screw/extrusion line speed | 10 rpm/15 m/min | Good/Good | Good/Good | Good/Good | Good/Good |
| | | 20 rpm/30 m/min | Poor/Good | Good/Good | Good/Poor | Good/Good |
| | | 30 rpm/45 m/min | Poor/Good | Good/Good | Good/Good | Good/Good |
| | | 40 rpm/60 m/min | Poor/Good | Good/Good | Good/Poor | Good/Good |
| | Set temperature (crosshead) | | 180 | 180 | 180 | 180 |
| Resin temperature ° C. | Number of revolutions of screw/extrusion line speed | 10 rpm/15 m/min | 182 | 181 | 184 | 182 |
| | | 20 rpm/30 m/min | 190 | 183 | 193 | 186 |
| | | 30 rpm/45 m/min | 194 | 186 | 199 | 188 |
| | | 40 rpm/60 m/min | 201 | 189 | 205 | 192 |
| Evaluation results of tubes (evaluation of samples obtained with number of revolutions of screw/extrusion line speed = 40 rpm/60 m/min) | | | | | | |
| | Tensile strength (MPa) | | 12.5 | 14.5 | 13.5 | 16.8 |
| | Tensile elongation (%) | | 260 | 260 | 261 | 272 |
| | 100% modulus | | 9.8 | 6.5 | 6.5 | 23.5 |
| Heat resistance | Tensile strength (MPa) | | 12.0 | 9.8 | 11.0 | 16.2 |
| | Tensile elongation (%) | | 255 | 201 | 253 | 280 |
| Oil resistance | Tensile strength (MPa) | | 5.8 | 2.6 | 6.5 | 13.7 |
| | Tensile elongation (%) | | 190 | 190 | 186 | 195 |
| | UL94 burning test | | V-0 | V-0 | V-0 | V-2 |
| | Processability | | Poor | Good | Good | Good |

The results in Tables IV to VI indicate the following.

Experimental examples 1 to 5 in which the composition ratio (mass ratio) of a chlorinated polyethylene to a polyolefin polymer is in the range of 98/2 to 80/20 and the content of calcium silicate-coated calcium hydroxide is 5 to 20 parts by mass, provide polymer tubes that have high mechanical strength (tensile strength and tensile elongation), heat resistance, oil resistance, and flame retardancy. In addition, shaping of flame-retardant flexible polymer compositions into polymer tubes by extrusion even at high line speeds did not cause generation of pores or rough surfaces; and processing by heat-pressing also did not cause generation of pores. The results indicate that these flame-retardant flexible polymer compositions meet an object of the present invention.

Incidentally, Experimental example 4 indicates that an increase in the composition ratio of the polyolefin polymer tends to result in a decrease in the flexibility. This result indicates that, in order to achieve higher flexibility, the composition ratio of the polyolefin polymer relative to 100 parts by mass of the polymer component is preferably 10 parts by mass or less.

Experimental example 3 indicates that an increase in the content of calcium silicate-coated calcium hydroxide tends to result in a decrease in the flexibility. This result indicates that, in order to achieve higher flexibility, the content of calcium silicate-coated calcium hydroxide relative to 100 parts by mass of the polymer component is preferably 10 parts by mass or less.

In Experimental example 5 in which a polyethylene polymer having a density of less than 0.95 g/cm$^3$ is used, the oil resistance meets the standard; however, the tolerance with respect to the standard is lower than that in Experimental examples 1 to 4. This result indicates that, in order to achieve higher oil resistance, the polyolefin polymer used is preferably a high-density polyethylene polymer having a density of 0.95 g/cm$^3$ or more.

In Experimental example 12 in which the composition ratio of the chlorinated polyethylene is larger than the range specified in the present invention, rough surfaces are generated by extrusion at high line speeds and the oil resistance is low. On the other hand, in Experimental example 13 in which the composition ratio of the polyolefin polymer is larger than the range specified in the present invention, the tube has such poor flame retardancy that does not meet the standards for heat-shrinkable tubes used for rendering electric wires and wiring harnesses for automobiles waterproof and insulated. These results indicate that the composition ratio (mass ratio) of a chlorinated polyethylene to a polyolefin polymer needs to be in the range of 98/2 to 80/20.

In Experimental example 11 in which the mixture (polymer component) of a chlorinated polyethylene and a polyolefin polymer is replaced by polyvinyl chloride mixed with a plasticizer, the tube has such poor oil resistance that does not meet the standards for heat-shrinkable tubes used for rendering electric wires and wiring harnesses for automobiles waterproof and insulated.

In Experimental example 6 in which the content of calcium silicate-coated calcium hydroxide is smaller than the range specified in the present invention, generation of pores occurs during extrusion at a high line speed and heat-pressing and the heat resistance tends to be low. On the other hand, in Experimental example 7 in which the content of calcium silicate-coated calcium hydroxide is larger than the range specified in the present invention, the mechanical strength tends to be low. These results indicate that the content of calcium silicate-coated calcium hydroxide relative to 100 parts by mass of the polymer component needs to be in the range of 5 to 20 parts by mass.

In Experimental examples 8, 9, and 10 in which calcium silicate-coated calcium hydroxide is replaced by calcium hydroxide particles (not having a surface containing calcium silicate), a zeolite compound (fired zeolite), or hydrotalcite, generation of pores occurs during extrusion at high line speeds and heat-pressing and the oil resistance is low.

What is claimed is:

1. A flame-retardant flexible polymer composition comprising:
   a polymer component that contains 98 to 90 parts by mass of a chlorinated polyethylene and 2 to 10 parts by mass of a polyolefin polymer; and
   calcium hydroxide particles having a surface containing calcium silicate,
   wherein a content of the particles relative to 100 parts by mass of the polymer component is 5 parts by mass or more and 10 parts by mass or less, and a chlorine content of the chlorinated polyethylene is 20% to 40% by weight,
   wherein the polyolefin polymer is a high-density polyethylene polymer having a density of 0.95 g/cm$^3$ or more,
   wherein the flame-retardant flexible polymer composition does not include a zeolite compound,
   wherein the flame-retardant flexible polymer composition is irradiated with ionizing radiation to cross-link the polymer component, and
   wherein after the flame-retardant flexible polymer composition is irradiated with ionizing radiation to cross-link the polymer component, the flame-retardant flexible polymer composition has a heat resistance such that the polymer composition has a tensile strength >8.3 MPa and a tensile elongation >175% after being stored at 121° C. for seven days, and the flame-retardant flexible polymer composition has an oil resistance such that the polymer composition has a tensile strength >6.9 MPa and a tensile elongation >175% after being immersed in an aircraft hydraulic fluid conforming to Military Specification MIL-H-5606 at room temperature for a day.

2. A polymer tube produced by shaping a flame-retardant flexible polymer composition into a tube, the polymer composition including a polymer component that contains 98 to 90 parts by mass of a chlorinated polyethylene and 2 to 10 parts by mass of a polyolefin polymer and calcium hydroxide particles having a surface containing calcium silicate in which a content of the particles relative to 100 parts by mass of the polymer component is 5 parts by mass or more and 10 parts by mass or less, and a chlorine content of the chlorinated polyethylene is 20% to 40% by weight, wherein the polyolefin polymer is a high-density polyethylene polymer having a density of 0.95 g/cm$^3$ or more; and by irradiating the polymer composition with ionizing radiation to cross-link the polymer component,
   wherein the flame-retardant flexible polymer composition does not include a zeolite compound, and
   wherein after the flame-retardant flexible polymer composition is irradiated with ionizing radiation to cross-link the polymer component, the flame-retardant flexible polymer composition has a heat resistance such that the polymer composition has a tensile strength >8.3 MPa and a tensile elongation >175% after being stored at 121° C. for seven days, and the flame-retardant flexible polymer composition has an oil resistance such that the polymer composition has a tensile strength >6.9 MPa and a tensile elongation >175% after being immersed in an aircraft hydraulic fluid conforming to Military Specification MIL-H-5606 at room temperature for a day.

3. An insulated wire comprising a conductor and an insulation covering the conductor, wherein the insulation is formed from a flame-retardant flexible polymer composition including a polymer component that contains 98 to 90 parts by mass of a chlorinated polyethylene and 2 to 10 parts by mass of a polyolefin polymer; and
   calcium hydroxide particles having a surface containing calcium silicate in which a content of the particles relative to 100 parts by mass of the polymer component is 5 parts by mass or more and 10 parts by mass or less, and a chlorine content of the chlorinated polyethylene is 20% to 40% by weight,
   wherein the polyolefin polymer is a high-density polyethylene polymer having a density of 0.95 g/cm$^3$ or more,
   wherein the flame-retardant flexible polymer composition is irradiated with ionizing radiation to cross-link the polymer component in the insulation, wherein the flame-retardant flexible polymer composition does not include a zeolite compound, and after the flame-retardant flexible polymer composition is irradiated with ionizing radiation to cross-link the polymer component in the insulation, the flame-retardant flexible polymer composition has a heat resistance such that the polymer composition has a tensile strength >8.3 MPa and a tensile elongation >175% after being stored at 121° C. for seven days, and the flame-retardant flexible polymer composition has an oil resistance such that the polymer composition has a tensile strength >6.9 MPa and a tensile elongation >175% after being immersed in an aircraft hydraulic fluid conforming to Military Specification MIL-H-5606 at room temperature for a day.

* * * * *